July 10, 1928.
W. W. MOYER
1,676,660
DRIVING MECHANISM FOR TALKING MACHINES
Original Filed April 26, 1918
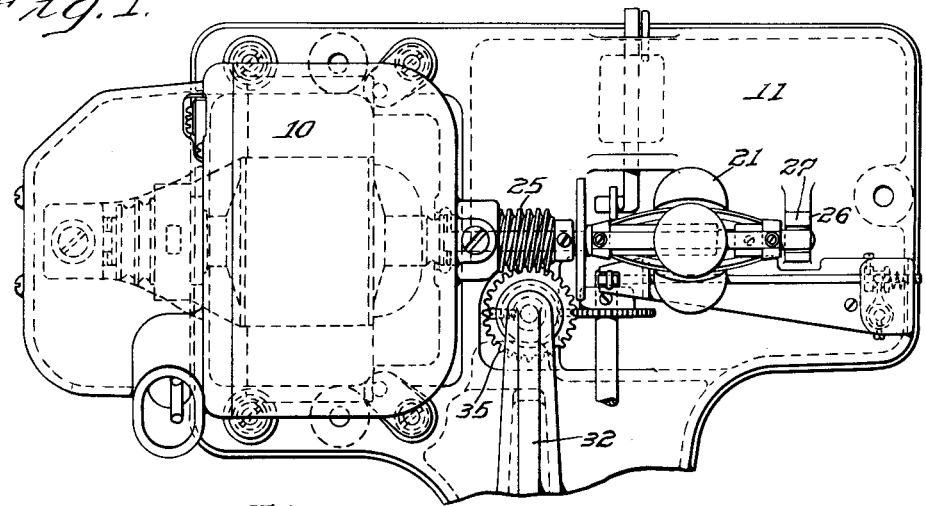
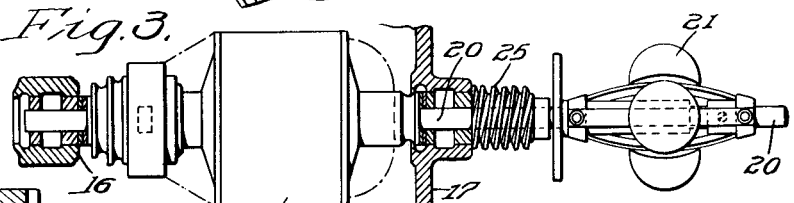
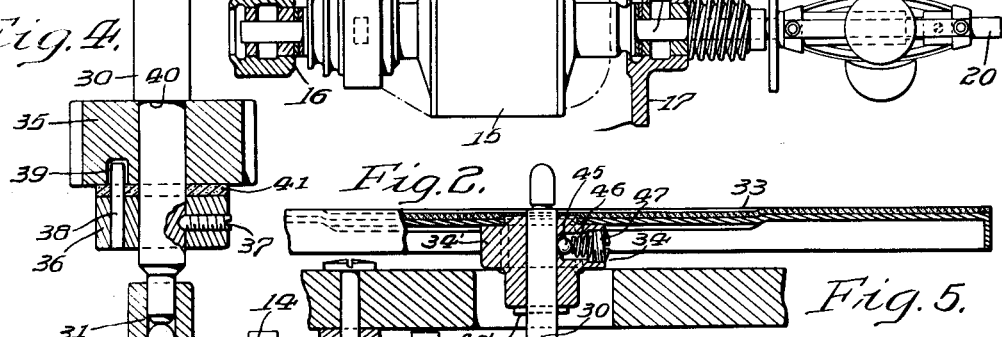
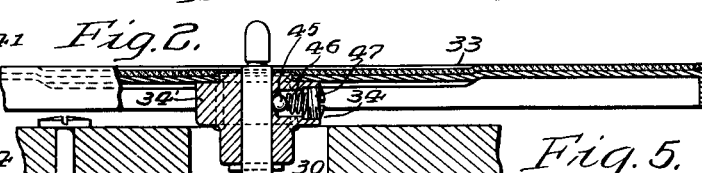
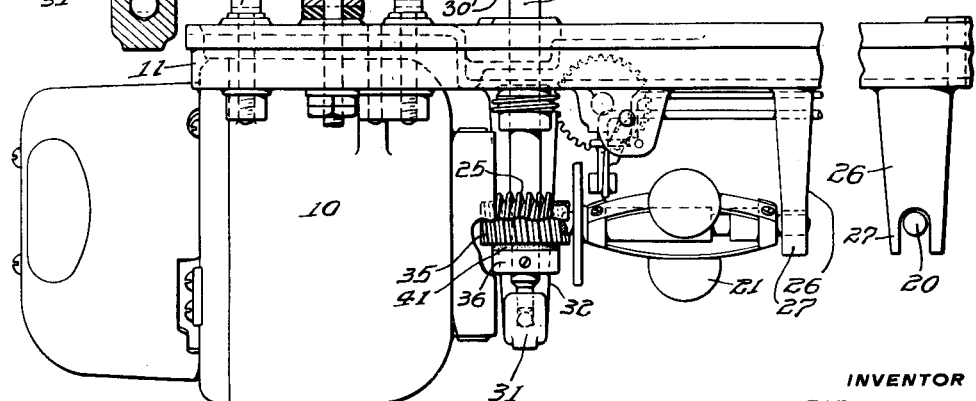
INVENTOR
William W. Moyer.
WITNESS
BY
ATTORNEYS Patented July 10, 1928.

1,676,660

UNITED STATES PATENT OFFICE.

WILLIAM W. MOYER, OF CAMDEN, NEW JERSEY, ASSIGNOR TO VICTOR TALKING MACHINE COMPANY, A CORPORATION OF NEW JERSEY.

DRIVING MECHANISM FOR TALKING MACHINES.

Application filed April 26, 1918, Serial No. 230,863. Renewed June 18, 1923.

This invention relates to a driving mechanism for talking machines in which the association of operating motor, governor and power transmission mechanism, as well as the inherent construction of the power transmission mechanism, is such as to provide a substantially noiseless, smooth-running talking machine operating mechanism whose speed of rotation may be very accurately and sensitively controlled and which operates, as a whole, with increased effectiveness, preventing and absorbing vibrations as well as compensating for wear of operating parts.

Certain features of this invention, therefore, relate to the manner in which the governor is connected to the motor and supported by the bearings of the motor itself thus eliminating the necessity for independent bearings for the governor, this feature being combined with the manner in which the power is delivered and transmitted to the turntable spindle of the talking machine so as to produce a device in which the loss of energy is reduced to a minimum and any variations in speed impressed on the mechanism either from the motor or from the turntable or record support, or from any other part of the device, are effectively and substantially immediately corrected or counteracted by the action of the governor.

Further objects of this invention relate, as suggested, more particularly to the elimination or absorption of vibrations during the transmission of power from the motor to the turntable spindle, thus resulting in the elimination of noise and producing a device having particular utility as an operating means for a sound reproducing mechanism, there being provided, as one means tending to effect these ends, a structure in which there is a certain amount of freedom of movement in the power transmitting elements of the mechanism and in which there is located certain vibration absorbing means, this association of elements having the further capacity mentioned above of tending to automatically compensate for any possible irregularity of construction or uneven wear of parts due to use.

Further objects of this invention are to provide in the general arrangement of the associated elements of the mechanism, a simplicity in the alignment of the various bearings in the device as well as a simplicity of construction throughout, thus resulting in a reduction to a minimum of the amount of material used and providing a structure which is relatively compact and requires less space when, for example, the mechanism is located in a talking machine, and furthermore providing a structure which may be readily assembled and which, when assembled, operates to automatically maintain substantially its proper adjustment during use, the whole mechanism operating throughout with increased efficiency and utility as an apparatus for operating the rotary record support or turntable of a talking machine.

This invention also includes certain novel details of construction and arrangement of operating parts as will appear from the description and the drawings and as hereinafter more particularly set forth in the appended claims.

In the drawings forming a part of this specification there is illustrated one form of mechanism for carrying this invention into practice but it is to be understood that the particular form illustrated is not necessarily essential to the invention and many alterations and modifications thereof may be readily made without departing from the spirit and scope of the invention.

Fig. 1 is a bottom plan view while Fig. 2 is a side elevation of one form of mechanism of this invention. Fig. 3 is an elevational view of the motor, shaft and governor, the bearings therefor being shown in section. Fig. 4 is a sectional view showing one manner in which the gear is attached to the turntable spindle, while Fig. 5 is an end elevational view of the end of the governor shaft and the protecting shield therearound.

In the form of mechanism chosen as the illustration of this invention; an electric motor 10 is shown as the source of driving power for the mechanism, it being understood that various other forms of motors, such as a spring motor, could be readily substituted therefor. The motor 10 in the construction illustrated is suitably supported from a top plate 11, as by the use of bolts 14, for example, it being evident that any means could be employed for properly positioning the motor in a talking machine and that the top plate 11 could be eliminated, if desired, and the motor secured in any other manner so long as the same is properly located relatively to the various operating elements in a sound reproducing mechanism.

The rotating or driving element 15 of the motor 10—being in the form of an armature when an electric motor is used—may be supported by suitable bearings 16 and 17 carried by the casing of the motor in any desired manner. As hereinbefore intimated, the governor for controlling the speed of the mechanism is intended to be so associated with the motor as to be entirely supported or carried thereby, having no independent supporting bearings of its own, and in the construction shown, the shaft 20 is extended through the bearing 17, for example, and the governor 21 directly mounted thereon. It is further evident that the governor 21 could be located on the opposite end of the shaft 20 from that shown in Fig. 3, and moreover, could be supported in any relative position to the motor 10 and be supported by the motor bearings without requiring any separate bearings for the governor itself and that various other arrangements could readily be made by those skilled in the art. The motor shaft 20 is adapted to operate a driving gear 25 which, in the form illustrated, consists of a worm gear or spiral gear or any other similar form of gearing secured to the shaft 20 and interposed between the bearing 17 and the governor 21. Although various other positions of the governor 21, worm 25, and supporting bearings therefor could readily be used, the arrangement shown has been found particularly efficient for the purposes intended as will hereinafter more fully appear. At the outer end of the shaft 20, as shown in Figs. 2 and 5, there may be provided a guard member 26 bifurcated at its lower end to form a yoke 27 adapted to surround and protect the free outer end of the shaft 20. The yoke 27, however, is not intended to support the governor shaft or form a bearing therefor excepting in a more limited use of the device, as will hereinafter appear.

The turntable spindle 30 in the form of construction illustrated herewith, is supported at its lower end in a suitable bearing 31, more clearly shown in Fig. 4, and, if desired, the bearing 31 may depend from the top plate 11 and be supported by a curved bracket 32 or any other form of supporting bearing or means for positioning the spindle 30 may be used. The turntable 33 may be rotated by the spindle 30 through a friction clutch 34 adapted to efficiently drive the turntable and at the same time permit the clutch to slip if the turntable were suddenly stopped, thus allowing the electric motor 10 to continue to run and avoiding the possibility of burning out the motor due to excessive load which would otherwise be imposed upon the same if the turntable 33 were inadvertently stopped without shutting off the supply of current to the motor. The hub 34' of the turntable 33 rests on the crosspin 30', passing through the spindle 30 and rigid therewith and is provided with a recess for the ball clutch 45. A spring 46 is held in operative position against the ball 45 by an adjustable set screw 47, this construction forming one suitable clutch mechanism of the character indicated.

One form of power transmission mechanism which is adapted to eliminate vibration and automatically operate to adjust and maintain the parts in smooth firm operating contact as well as operate to compensate for any possible uneven alinement or irregular wear of parts, is shown in the manner in which the driven gear 35, operated from the worm 25, is associated with the turntable spindle 30, it being evident, of course, that the same form of flexible, non-rigid self-adjustable mounting for the driving gear 25 could be utilized to attain the objects of this invention. In the form illustrated, the gear 35 is intended to have a certain amount of universal or rotational and longitudinal freedom on the spindle 30 and consequently a similar freedom of relative movement between the gear 35 and the driving worm 25, this arrangement constituting one means for tending to eliminate or absorb vibration during operation, as well as automatically operate to compensate for any possible irregularity or eccentricity of operating parts or unevenness in wear due to use. The particular connection shown consists in securing a collar 36 to the spindle 30, as by way of the screw 37, and providing the collar with a stud or pin 38 extending parallel to the spindle 30 and projecting above the collar 36 into a recess 39 in the worm gear 35. The opening 39 in the gear 35 is made somewhat larger than the end of the pin 38 thus providing a limited amount of rotational freedom between the gear 35 and the collar 36. Moreover, the gear 35 is loosely mounted on the spindle 30 and may move longitudinally thereof to a limited extent between a shoulder 40 on the spindle 30 and the collar 36 which is fixed to the lower end of the spindle, as stated, and, of course, a collar or any other means could be used in place of the shoulder 40 just described and a shoulder could be used in place of the collar 36.

As further tending to eliminate noise and suppress vibration, there is suitably interposed at any point in the transmission mechanism, as between the collar 36 and the gear 35, a more or less flexible, yieldable, sound deadening and vibration absorbing member 41. Various kinds of materials could readily be used to provide an efficiently operating means for this purpose, but the material which has been found to be particularly efficient comprises a felt washer whose thickness and character may be widely varied as desired, dependent upon the size, character and alignment of the various elements of the gear transmission mechanism which acts between the motive power and the turntable spindle. As a further means tending to attain the objects sought by this invention, the gear 35 may be made of a material which is particularly quiet in operation, easily manufactured, uniform in structure and smooth-running in operation, and it has been found that a gear 35 of suitable non-metallic material, such as wood, for example is especially adapted to these ends.

The operation of this invention will be readily understood from the foregoing description taken in connection with the drawings wherein it will be seen that when the motor is started, as when the current is turned on, if an electric motor be used, the armature or rotor 15 will be revolved and hence the worm 25 and governor 21 will be rotated accordingly. By locating the governor directly on the shaft 20 of the motor or securing the governor shaft to the shaft 20, it will be seen that this forms one means whereby the usual bearings for the governor are eliminated and the alignment of the parts is thereby greatly simplified and more accurately insured, while at the same time considerable saving of material and overall length of the motor mechanism is obtained, and furthermore, by reason of the rigid connection between the governor and the motor, a highly sensitive and quickly responding speed controlling device is produced. Moreover, by reason of the character and location of the driving gear on the shaft 20 relative to the motor, governor and the gear 35 of the turntable spindle 30, a structure is provided in which loss of energy is reduced to a minimum, the governor may respond quickly to variations in speed of the motor or the turntable, and furthermore, the shaft 20 is always maintained in close operative contact with its bearings 16 and 17 even after wear, due to use, this action being accomplished by reason of the relative positions of the parts and apparently on account of the effect of the gear 35 in tending to constantly urge the shaft 20 against that portion of the bearings 16 and 17 located on the opposite side of the shaft 20 from which the gear 35 and spindle 30 are located. Thus a smooth-running and quietly operating mechanism is obtained by this construction in so far as the motor, governor and driving elements of the mechanism are concerned.

The limited longitudinal and rotational freedom of the gear 35 on the shaft 30 operating in the manner just described contributes to the production of a substantially noiseless, non-vibrating and automatically adjusting mechanism particularly adapted for use in driving the turntable of a talking machine in a highly efficient manner. It will be noted that the pitch of the worm 25 and the teeth on the gear 35 is such as to tend during operation to not only rotate the spindle 30 but to also force the spindle downwardly and maintain it firmly against its supporting bearing. Moreover, the washer 41, being made of felt or other suitable material, not only operates to deaden sound and suppress vibrations but also acts as a more or less resilient or yielding member tending to move the gear 35 in the opposite direction to that in which it is urged by the worm 25, thus reacting against a tendency of the worm 25 to move the gear 35 downwardly or against the bearing 31. It will therefore be seen that the gear 35 is free to move in both directions longitudinally of the spindle 30, and therefore relatively to the worm 25, and that this movement may be automatically accomplished in the normal operation of the device with a result that, in view of the inclination of the teeth on the gear 35, this gear is brought nearer or farther away from its operative relation to the worm 25 and the mechanism automatically adjusts itself into proper position in which the gears engage each other in an intimate, smooth manner, thus eliminating noise in operation and providing a structure having a capacity for compensating for any possible irregularity which may occur in the wear of the operating members.

By reason of the limited amount of rotational freedom of the gear 35 relative to the spindle 30 attained through the relative sizes of the recess 39 and the pin 38, it will be seen that a further flexibility or non-rigidity of this transmission mechanism is provided, this flexibility appearing to operate to avoid any possible occurrence of periodic noises or vibrations which might otherwise occur in a rigid transmission mechanism due to a variety of factors including any possible eccentricity in the alignment of the gearing or other inherent minute possible irregularities in the construction of the gears themselves.

The guard member 26, by reason of its forked or yoked end 27, provides a means for protecting the rotating end of the governor shaft or the shaft 20 during normal use of the device and has a further utility of forming a support for the outer end of the governor when the mechanism is detached from the talking machine and inverted for the purposes of repair and inspection.

As a further means cooperating to produce an efficiently operating mechanism for the purposes intended, the friction clutch 34 between the spindle 30 and the turntable 33 operates as indicated above to prevent the occurrence of possible injury to an electric motor 10 if the turntable 33 be suddenly stopped without shutting off the supply of current to the motor. In such case, the ball 45 will slip relatively to the spindle 30 and permit the motor 10 to continue to operate and hence no excessive increase of load is imposed on the motor nor is the armature of the motor actually stopped while current is being supplied thereto and by this arrangement the whole device is protected against injury under all possible operating conditions to which the device may be subjected. Moreover, the friction clutch 34 further cooperates with the governor 21 as well as the form of non-rigid drive between the gear 25 on the motor shaft and the gear on the spindle 30 to protect these elements against a possible dearrangement or injury due to a sudden stopping of the turntable in a manner similar to that described in connection with the relation of the clutch 34 to the motor 10 since the slipping effected between the turntable 33 and the spindle 30 prevents the transmission of excessive reverse strain through the transmission mechanism from the spindle 30 to the gear 25 and to the governor 21. These features cooperate as indicated to produce an extremely efficient combination of means particularly adapted for use in connection with a talking machine.

The mechanism described has been found to provide throughout a substantially noiseless, smooth-running driving mechanism for rotating the record support of a talking machine, but it is also stated that the theory of operation or the causes and effects produced, may vary widely from that described and the device may operate upon substantially different principles from those referred to in obtaining the highly desired results specified. It is also apparent that various other arrangements and associations of the elements of the mechanism from that disclosed herein might be readily made in attaining these advantageous results.

Having thus described my invention, I claim and desire to protect by Letters Patent of the United States:

1. An operating mechanism for talking machines including a motor having a rotatable shaft, a pair of supporting bearings therefor, one of which is intermediate the ends of said shaft, and a governor mounted on the free end of said shaft and entirely supported by said shaft, in combination with a driving gear secured to said shaft, a turntable spindle and a gear on said spindle adapted to mesh with said driving gear and to be driven thereby.

2. An operating mechanism for talking machines including a motor shaft and a governor associated therewith and entirely supported thereby, in combination with a driving gear actuated by said motor shaft, a turntable shaft, a gear for said turntable shaft adapted to be directly engaged by and operated from said driving gear and means for so mounting one of said gears as to permit the same to have a limited amount of rotative and longitudinal movement on its shaft.

3. In a power transmission mechanism for talking machines, the combination of a rotatable driving gear, a turntable spindle, a driven gear on said spindle actuated by said driving gear and rotatively and longitudinally movable on said spindle, a loose connection between said driven gear and said spindle and resilient means between said driven gear and said spindle to yieldingly oppose the longitudinal movement of said driven gear on said spindle.

4. In a power transmission mechanism for talking machines, the combination of a shaft, a turntable spindle, a driven gear on said spindle having a relatively limited longitudinal and rotative movement on said spindle, a driving gear on said shaft meshing with and driving said driven gear, a loose connection between said spindle and said driven gear, and resilient means between said driven gear and said spindle to oppose the longitudinal movement of said driven gear due to the thrust of said driving gear on said driven gear.

5. In a power transmission mechanism for talking machines, the combination of a motor driven shaft, a worm on said shaft, a turntable spindle, a collar fixed to said spindle, a worm gear loosely mounted on said spindle adapted to be driven by the worm on said shaft, means for operatively connecting said worm gear and said collar and a yieldable vibration suppressing member interposed between said gear and said collar.

6. In a power transmission mechanism for talking machines, the combination of a rotatable driving gear, a spindle, a turntable on said spindle, a driven gear on said spindle movable with respect to said spindle and actuated by said driving gear, resilient means between said spindle and said driven gear to permit said gear to move slightly longitudinally of said spindle, and rigid means between said driven gear and said spindle to drive said spindle from said driven gear and loosely connected to one of them to permit of a relatively slight rotary movement between the driven gear and the spindle.

7. An operating mechanism for talking machines including a motor having a rotatable shaft, supporting bearings therefor, said shaft extending beyond one of said bearings, a governor carried by the extended portion of said shaft and entirely supported by said shaft, a guard member for protecting the free end of said shaft and means for transmitting power from said shaft to the rotary record support of said talking machine.

8. In a power transmission mechanism for talking machines, the combination of a shaft, a driving gear on said shaft, a turntable spindle, a member adapted to move with said spindle, a gear loosely mounted on said spindle adapted to be driven by said first-mentioned gear, a loose connection between the gear on said spindle and said member to thereby provide a limited free driving connection from said shaft to said turntable spindle, a turntable and a yieldable connection between said spindle and said turntable for the purposes specified.

9. In a governing mechanism, the combination of a relatively stationary rigid bearing, a shaft mounted in and extending through and beyond said bearing to present a free end, a governor mounted on said free end of said shaft, and rigid means mounted adjacent the free end of said shaft but normally out of contact therewith to prevent said shaft from becoming bent or sprung.

10. In a talking machine, the combination of an electric motor, a spindle positively driven thereby, a turntable mounted on said spindle and provided with a hub, said hub being provided with an axial cylindrical opening therethrough and spring pressed means mounted in said hub and pressing against the smooth circumferential surface of said spindle to frictionally secure said turntable to said spindle to positively drive said turntable from said spindle during the normal operation of the machine in reproducing sound and to automatically release said turntable from its driving connection with said spindle when the rotation of the turntable is suddenly stopped or substantially retarded and the current to the motor is not cut off.

In witness whereof, I have hereunto set my hand this 23rd day of April, A. D., 1918.

WILLIAM W. MOYER.